US012806973B2

(12) United States Patent
Ramesh et al.

(10) Patent No.: US 12,806,973 B2
(45) Date of Patent: Nov. 24, 2026

(54) PIVOTING CURSOR FOR FRAMELESS GLASS IN A VEHICLE

(71) Applicant: INTEVA PRODUCTS, LLC, Troy, MI (US)

(72) Inventors: Santosh Ramesh, Bengaluru (IN); Vinay Mane P B, Bengaluru (IN)

(73) Assignee: INTEVA PRODUCTS, LLC, Troy, MI (US)

( * ) Notice: Subject to any disclaimer, the term of this patent is extended or adjusted under 35 U.S.C. 154(b) by 696 days.

(21) Appl. No.: 17/848,959

(22) Filed: Jun. 24, 2022

(65) Prior Publication Data

US 2022/0410669 A1 Dec. 29, 2022

(30) Foreign Application Priority Data

Jun. 24, 2021 (IN) ............................. 202111028331

(51) Int. Cl.
*B60J 1/14* (2006.01)
*B60J 1/00* (2006.01)

(52) U.S. Cl.
CPC ...................................... *B60J 1/14* (2013.01); *B60J 1/004* (2013.01)

(58) Field of Classification Search
CPC ....... B60J 1/14; B60J 1/004; B60J 1/12; B60J 1/17; E05F 15/689; E05F 11/385
USPC .................................................... 49/374, 375
See application file for complete search history.

(56) References Cited

U.S. PATENT DOCUMENTS 6,453,617 B1 * 9/2002 Klippert ................ E05F 11/385 49/375
6,827,320 B2 12/2004 Yeh
8,096,080 B2 * 1/2012 Pavlovic ............... E05F 11/488 49/374
9,546,509 B2 1/2017 Siekierka et al.
11,162,291 B2 * 11/2021 Reames ................ E05F 11/488
11,168,501 B2 * 11/2021 Pavlovic
11,377,892 B2 * 7/2022 Hampel ................ E05F 11/483
11,577,583 B2 * 2/2023 Barr .......................... B60J 1/006
11,674,347 B2 * 6/2023 Arimoto .................... B60J 1/17 49/404

(Continued)

FOREIGN PATENT DOCUMENTS

CN 116696179 A * 9/2023 ................ B60J 1/17
CN 118140033 A * 6/2024 ........... E05D 15/165

(Continued)

OTHER PUBLICATIONS

CNIPA Notification of the First Notice to Make Rectification for corresponding CN Application No. 202221613552.6; Mailing Date, Sep. 7, 2022.

(Continued)

*Primary Examiner* — Gregory J Strimbu
(74) *Attorney, Agent, or Firm* — CANTOR COLBURN LLP

(57) ABSTRACT

A pivoting cursor for a frameless window of a vehicle door, including: a main body portion; a pivoting plate pivotally secured to the main body portion for pivotal movement about an axis; a glass clamping plate; a seal; a first adjusting screw for pivoting the pivoting plate with respect to the main body portion; and a second adjusting screw adjusting a location of the main body portion with respect to the pivoting plate.

15 Claims, 4 Drawing Sheets

(56) References Cited

U.S. PATENT DOCUMENTS

| | | | | |
|---|---|---|---|---|
| 2009/0007494 | A1* | 1/2009 | Pavlovic | E05F 11/488 49/348 |
| 2014/0082887 | A1 | 3/2014 | Siekierka et al. | |
| 2018/0326820 | A1* | 11/2018 | Huang | E05F 11/385 |
| 2020/0173212 | A1* | 6/2020 | Pavlovic | E05F 11/385 |
| 2020/0338965 | A1* | 10/2020 | Barr | E05D 15/165 |
| 2020/0386026 | A1* | 12/2020 | Reames | E05F 11/385 |
| 2022/0314762 | A1* | 10/2022 | Barr | B60J 1/17 |
| 2022/0410669 | A1* | 12/2022 | Ramesh | B60J 1/004 |

FOREIGN PATENT DOCUMENTS

| | | | | | |
|---|---|---|---|---|---|
| DE | 10331001 | A1 | | 4/2004 | |
| DE | 202011101342 | U1 | | 8/2012 | |
| DE | 102012102795 | A1 | * | 10/2013 | E05F 11/385 |
| DE | 202022101779 | U1 | * | 8/2022 | B60J 1/004 |
| DE | 102022107881 | A1 | | 10/2022 | |
| EP | 1076750 | A2 | | 2/2001 | |
| EP | 1076750 | B1 | | 2/2001 | |
| EP | 2715021 | A1 | | 4/2014 | |
| EP | 2715021 | B1 | | 4/2014 | |
| EP | 2644816 | B1 | | 8/2018 | |
| KR | 101846922 | B1 | * | 4/2018 | |
| WO | 9957400 | A2 | | 11/1999 | |
| WO | 2020220021 | A1 | | 10/2020 | |

OTHER PUBLICATIONS

FR OA Issued Oct. 11, 2023 in IPL1417FR.

German Notice of Opposition corresponding to DE Application No. 10 2022 115 669; Issue Date, May 24, 2024, 70 pages.

German Office Action for German Application No. 102022115699.0, Issued Jul. 22, 2022, 6 Pages (No Machine Translation).

German Office Action for German Application No. 202022103506.7, Issued Jul. 21, 2022, 1 Page (No Machine Translation).

Notice of Opposition for corresponding DE Application No. 10 2022 115 699.0; Mailing Date, Dec. 8, 2023.

French Search Report for FR Application No. 2206254; Issue date, Jun. 30, 2025, 6 pages.

Written Opinion for FR Application No. 2206254; Issue date, Jun. 30, 2025, 12 pages.

French Office Action corresponding to FR Application No. 2206254; Issue date Oct. 11, 2023, 1 page.

CNIPA Notification of the First Office Action corresponding to CN Application No. 202210722955.2; Issue date, Dec. 23, 2025, 17 pages.

CNIPA Rejection Decision corresponding to CN Application No. 202210722955.2; Issue date, Jun. 26, 2026, 12 pages.

* cited by examiner

PIVOTING CURSOR FOR FRAMELESS GLASS IN A VEHICLE

CROSS REFERENCE TO RELATED APPLICATIONS

This application claims the benefit of Indian Provisional Patent Application No. 202111028331 filed on Jun. 24, 2021 the entire contents of which are incorporating herein by reference thereto.

BACKGROUND

Exemplary embodiments of the present disclosure pertain to the art of vehicle windows and in particular frameless window systems.

Frameless window systems are adjusted for glass sealing in the Y direction by adjusting the regulator rails by means of slotted brackets or Jack screws.

However, this method can limit the stiffness of the system, is costly in tools and components, and can adversely affect the glass system deflection. In addition and when the adjustment is performed on the rail, additional clearances are needed in the door for rail packaging.

BRIEF DESCRIPTION

Disclosed is a pivoting cursor for a frameless window of a vehicle door, including: a main body portion; a pivoting plate pivotally secured to the main body portion for pivotal movement about an axis; a glass clamping plate; a seal; a first adjusting screw for pivoting the pivoting plate with respect to the main body portion; and a second adjusting screw adjusting a location of the main body portion with respect to the pivoting plate.

In addition to one or more of the features described above, or as an alternative to any of the foregoing embodiments, a connecting member that is secured to the main body portion via the second adjusting screw.

In addition to one or more of the features described above, or as an alternative to any of the foregoing embodiments, the second adjusting screw is parallel to the first adjusting screw.

In addition to one or more of the features described above, or as an alternative to any of the foregoing embodiments, the second adjusting screw directly connects the main body portion to the pivoting plate.

In addition to one or more of the features described above, or as an alternative to any of the foregoing embodiments, the second adjusting screw is offset from the first adjusting screw.

In addition to one or more of the features described above, or as an alternative to any of the foregoing embodiments, the second adjusting screw is parallel to the first adjusting screw.

Also disclosed is a door module, including: a window regulator secured to an inner door panel of the door module, the window regulator including a pair of guide rails fixedly secured to the inner door panel of the door module; and a pivoting cursor for slidably engaging one of the pair of guide rails, the pivoting cursor including: a main body portion; a pivoting plate pivotally secured to the main body portion for pivotal movement about an axis; a glass clamping plate; a seal; a first adjusting screw for pivoting the pivoting plate with respect to the main body portion; and a second adjusting screw adjusting a location of the main body portion with respect to the pivoting plate.

In addition to one or more of the features described above, or as an alternative to any of the foregoing embodiments, a connecting member that is secured to the main body portion via the second adjusting screw.

In addition to one or more of the features described above, or as an alternative to any of the foregoing embodiments, the second adjusting screw is parallel to the first adjusting screw.

In addition to one or more of the features described above, or as an alternative to any of the foregoing embodiments, the second adjusting screw directly connects the main body portion to the pivoting plate.

In addition to one or more of the features described above, or as an alternative to any of the foregoing embodiments, the second adjusting screw is offset from the first adjusting screw.

In addition to one or more of the features described above, or as an alternative to any of the foregoing embodiments, the second adjusting screw is parallel to the first adjusting screw.

In addition to one or more of the features described above, or as an alternative to any of the foregoing embodiments, a nut is provided for locking a position of the first adjusting screw with respect to the main body portion.

Also disclosed is a method of mounting a frameless window of a vehicle to a door module, including: securing a portion of the frameless window to a pivoting cursor slidably engaging one of a pair of guide rails of a window regulator secured to the door module; and adjusting a location of the frameless window by pivoting a pivoting plate of the pivoting cursor with respect to a main body portion of the pivoting cursor, the pivoting cursor further comprising a first adjusting screw for pivoting the pivoting plate with respect to the main body portion and a second adjusting screw adjusting the location of the main body portion with respect to the pivoting plate.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The present disclosure is directed to a cursor with four main elements: a cursor body that is configured to slide along a rail; a pivoting plate or swing plate with a threaded adjuster; a clamping plate; and an isolator which is captured in the assembly by a clamp screw which is partially installed into the sub assembly for ease of assembly at the original equipment manufacturer (OEM).

Figure 2:
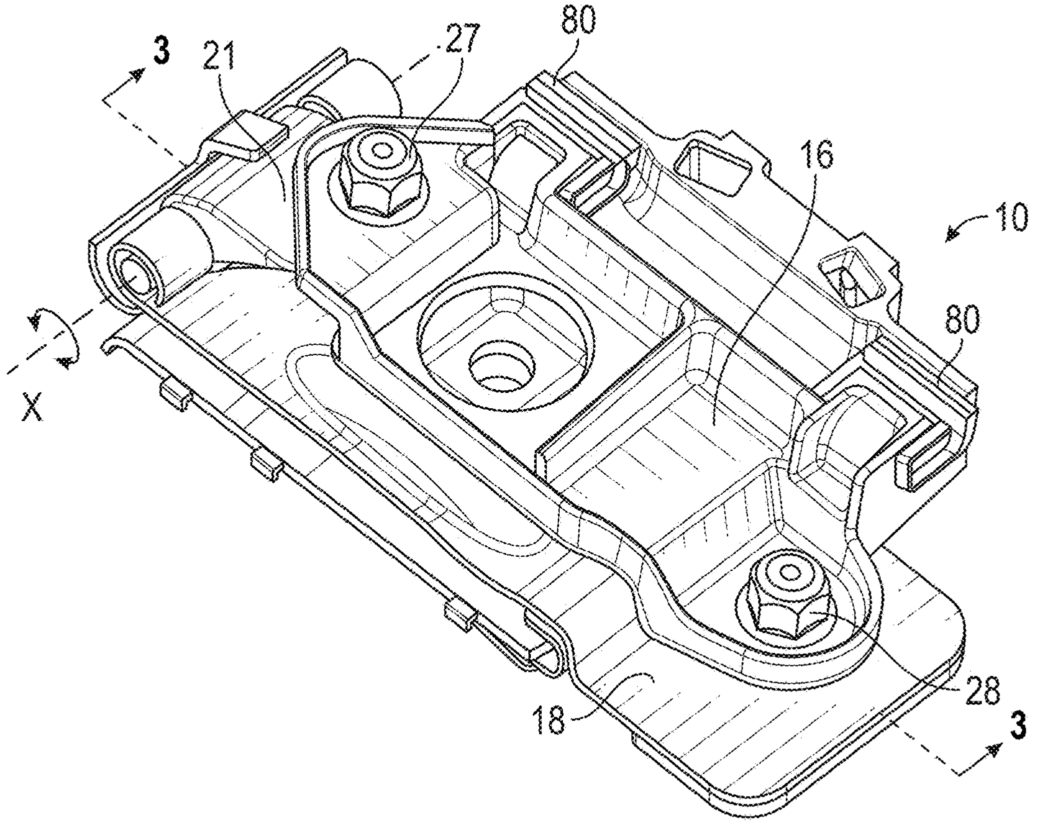
FIG. 2 is a perspective view of a pivoting cursor in accordance with an embodiment of the present disclosure.
Figure 3:
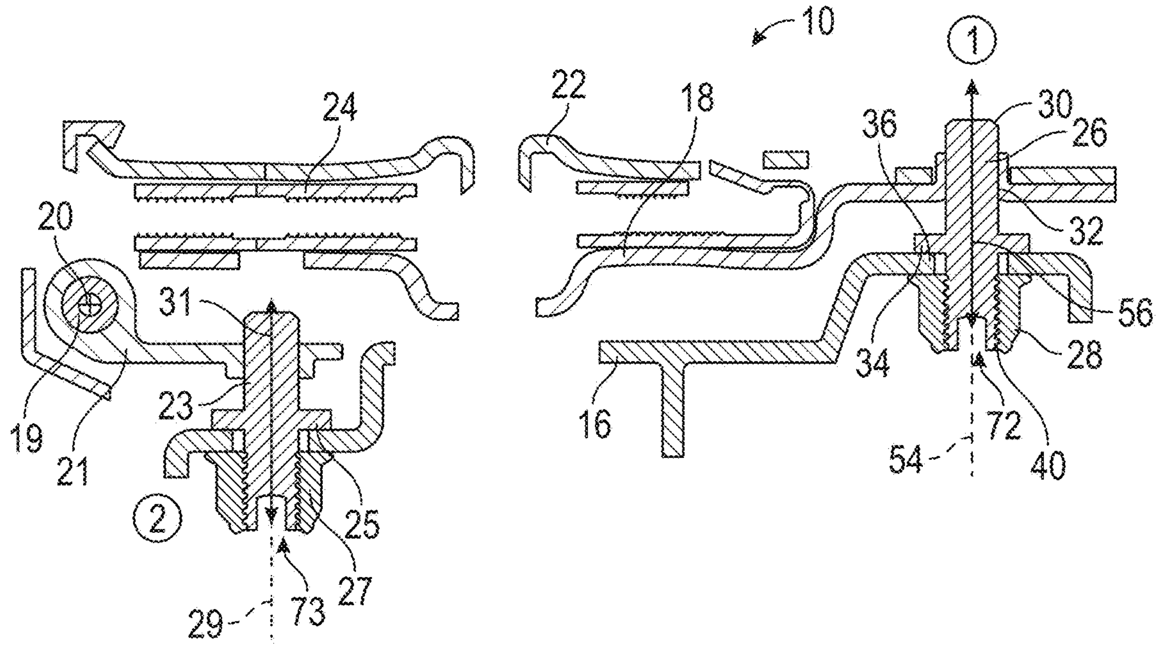
FIG. 3 is a view along lines 3-3 of FIG. 2.

Referring now to the FIGS. and in particular the FIGS., a pivoting cursor 10 for use with a window regulator 12 of a vehicle door module 14 in accordance with various embodiments of the present disclosure is illustrated. Referring now to the embodiment illustrated in at least FIGS. 2 and 3, the pivoting cursor 10 includes a main body portion 16, a pivoting plate or swing plate 18 pivotally secured to the main body portion 16 by a pivot pin 19 for pivotal movement about an axis 20, a clamping plate or glass clamping plate 22, a seal or isolator 24, a first adjusting screw or first threaded adjuster 26 for pivoting the pivoting plate 18 with respect to the main body portion 16 and a locking nut 28 for maintaining the first adjusting screw or first threaded adjuster 26 in a desired position once the cursor 10 has been adjusted via rotational movement of the first adjusting screw or first threaded adjuster 26.

In one embodiment, the pivoting plate or swing plate 18 is rotationally or pivotally mounted to the pivot pin 19 or a shaft, rod or elongated member 19. The pivot pin 19 is secured to a connecting member 21 that is secured to the main body portion 16 via a second adjusting screw 23 or second threaded adjuster 23. The second adjusting screw 23 or second threaded adjuster 23 threadingly engages the connecting member 21 for adjusting the location of the main body portion 16 with regard to the connecting member 21. The second adjusting screw 23 or second threaded adjuster 23 has a flange 25 for engaging the main body portion 16 and a locking nut 27 for maintaining the second adjusting screw or second threaded adjuster 23 in a desired position once the cursor 10 has been adjusted via rotational movement of the second adjusting screw or second threaded adjuster 23.

In one embodiment, the first adjusting screw or first threaded adjuster 26 includes a first threaded portion 30 for threadingly engaging a threaded opening 32 of the cursor body 16. In addition, the first adjusting screw or first threaded adjuster 26 also includes a flange portion 34 that is larger than an opening 36 in the clamping plate or glass clamping plate 22. The first adjusting screw or first threaded adjuster 26 also includes a second threaded portion 28 that threadingly engages threads 40 of the locking nut 28.

A portion of a vehicle window 42 is located between the pivoting plate or swing plate 18 and the glass clamp plate 22. A seal or isolator 24 is located between the window 42 and the pivoting plate or swing plate 18 and the glass clamp plate 22. In order to secure the window 42 to the pivoting cursor 10, a glass clamp screw threadingly engages a threaded opening in the pivoting plate or swing plate 18.

Once the pivoting plate or swing plate 18 is secured to the main body portion 16 via the first adjusting screw or first threaded adjuster 26 engaging threaded opening 32, rotation of the first adjusting screw or first threaded adjuster 26 about axis 54 will cause the pivoting plate or swing plate 18 and glass clamp plate 22 to move in the directions of arrows 56 along axis 54. This movement will cause the pivoting plate or swing plate 18 to pivot about axis 20 about pivot pin 19, which will in turn cause movement of the window 42 in order to provide an adjustment in the Y-direction when installing the window 42 in a vehicle. This is particularly useful in a frameless door window design. In addition and by configuring the cursor 10 such that the first adjusting screw or first threaded adjuster 26 can be rotated by a tool from an inboard side of the vehicle allows for convenient access when the vehicle window 42 is being installed in a vehicle.

Still further, further adjustment may be provide by rotating the second adjusting screw or second threaded adjuster 23. Rotation of the second adjusting screw or second threaded adjuster 23 about axis 29 will cause the cursor body 16 to move in the directions of arrows 31 along axis 29.

Figure 1:
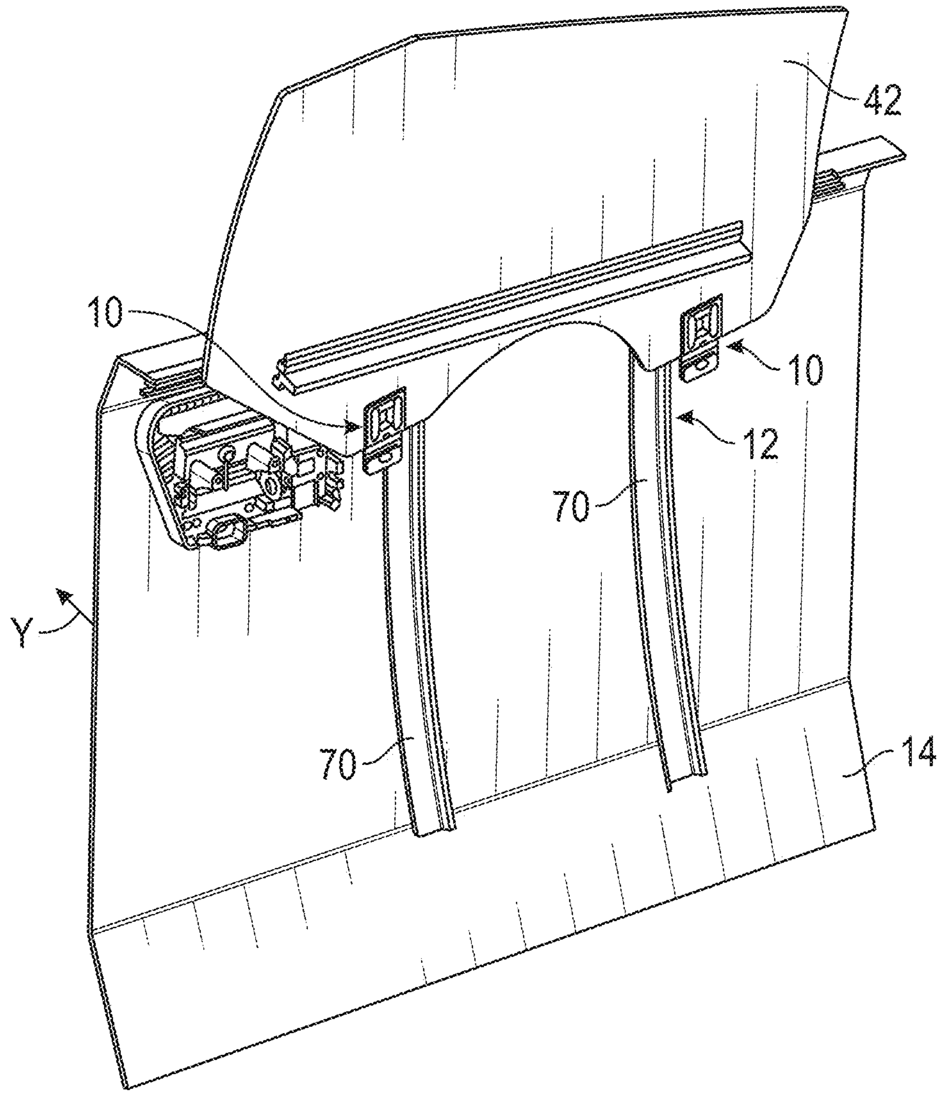
FIG. 1 is a partial perspective view of a vehicle door and window with a pivoting cursor in accordance with the present disclosure.

As illustrated in at least FIG. 1, the pivoting cursor 10 is configured to slidably engage a rail 70 of the window regulator 12. In FIG. 1, the window regulator 12 is a dual window regulator having a pair of guide rails 70 and a pair of cursors 10.

In one non-limiting embodiment, a window regulator 12 for a front door assembly only uses the pivoting cursor 10 for the rear portion of the window 42 while a separate non-pivoting cursor is used for the forward portion of the window 42 each being slidably secured to a respective one of the guide rails 70. In another non-limiting embodiment, the window regulator 12 for the front door assembly uses a pivoting cursor 10 for both the rear portion of the window 42 and the forward portion of the window 42 each being slidably secured to a respective one of the guide rails 70. In yet another non-limiting embodiment, the window regulator 12 used with a rear door assembly employs the pivoting cursor 10 for both the forward portion of the window 42 and the rear portion of the window 42, each being slidably secured to a respective one of the guide rails 70. Still further and in yet another alternative embodiment, the window regulator for a rear door assembly may use a pivoting cursor for only the rear portion of the window 42 and a separate non-pivoting cursor for the forward portion of the window 42 each being slidably secured to a respective one of the guide rails 70. In yet another alternative and in either the front door assembly or the rear door assembly the pivoting cursor may be used for the forward portion of the window 42 and a non-pivoting cursor may be used for the rear portion of the window each being slidably secured to a respective one of the guide rails 70.

The pivoting cursors 10 are adjustable from an inboard side of the vehicle with or without the door closed. The first adjusting screw or first threaded adjuster 26 and the second adjusting screw or second threaded adjuster 23 may be rotated to adjust the location of the pivoting cursor 10 and accordingly window 42. Once the adjustment corresponding to the precise and actual geometry of the vehicle which variates due to construction tolerances, the first adjusting screw or first threaded adjuster 26 is held in position by a first tool inserted into opening 72 while the locking nut 28 is tightened with a second tool such that position of the pivoting plate or swing plate 18 with respect to the main body portion 16 is maintained and any further rotation of the first adjusting screw or first threaded adjuster 26 is prevented. In addition and once the desired positioned position of the second adjusting screw or second threaded adjuster 23 is provided, the second adjusting screw or second threaded adjuster 23 is held in position by a first tool inserted into opening 73 while the locking nut 27 is tightened with a second tool such that position of the main body portion 16 defined with respect to the connecting member 21 and any further rotation of the second adjusting screw or second threaded adjuster 26 is prevented.

In one alternative embodiment, the guide rail 70 is a hollow tube or structure formed from a metal such as aluminum, steel, metallic alloys or the hollow tube formed from a plastic material, or a plastic composite material. Still further and in one nonlimiting embodiment, the main body portion 16 of the pivoting cursor 10 or a portion thereof is configured to completely surround a periphery of the guide rail 70. As such, the portion of the main body portion 16 of the pivoting cursor 10 surrounding the guide rail 70 will have multiple contact points with the guide rail in order to prevent twisting of the pivoting cursor as it slides up and down the guide rail 70.

In one non-limiting embodiment, the main body portion 16 of the pivoting cursor 10 is formed from an easily molded material such as plastic of nylon and the main body portion 16 is configured to have a have an insert or inserts 80 such as a polyoxymethylene (POM) insert that defines an opening for the guide rail 70 to slide therethrough. In one embodiment, the main body portion 16 of the pivoting cursor 10 is over-molded onto the insert. In one embodiment, the main body 16 of the pivoting cursor 10 is a nylon cursor over-molded onto the polyoxymethylene (POM) insert.

Figure 4:
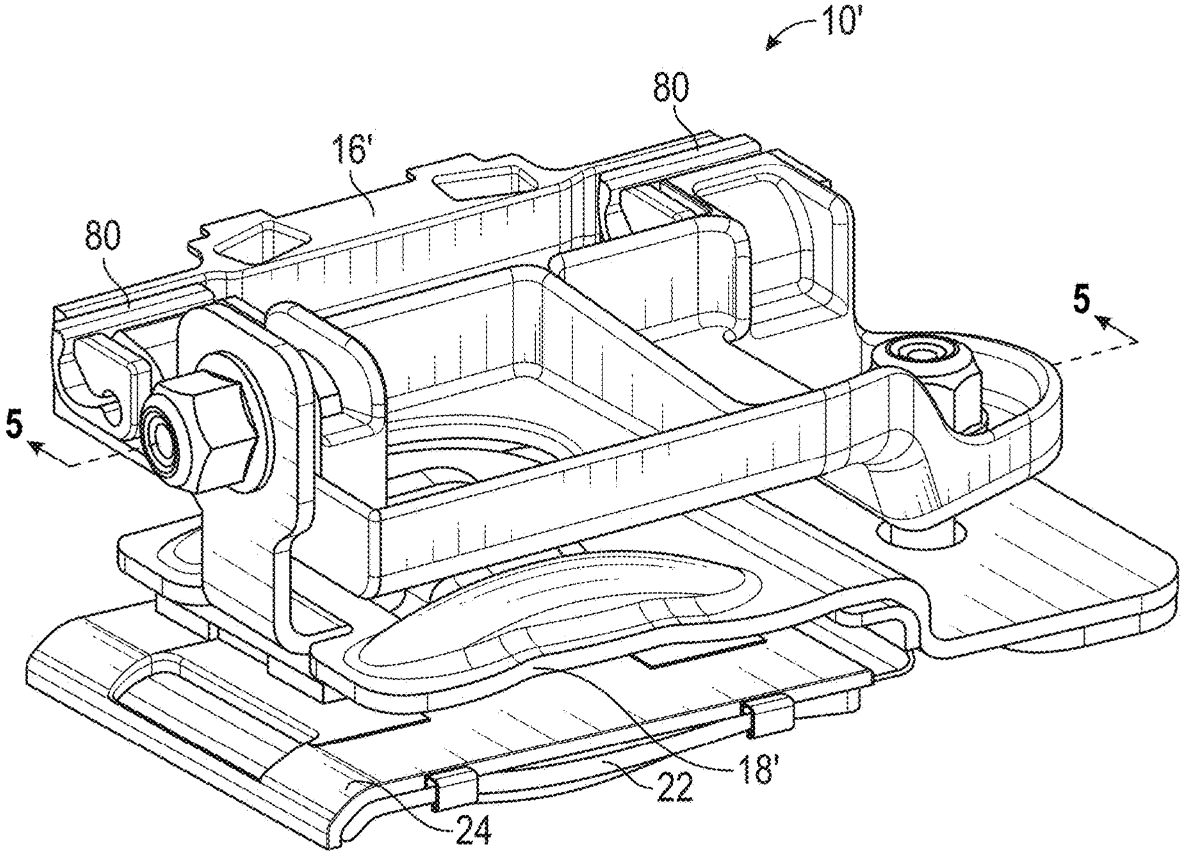
FIG. 4 is a perspective view of a pivoting cursor in accordance with another embodiment of the present disclosure.
Figure 5:
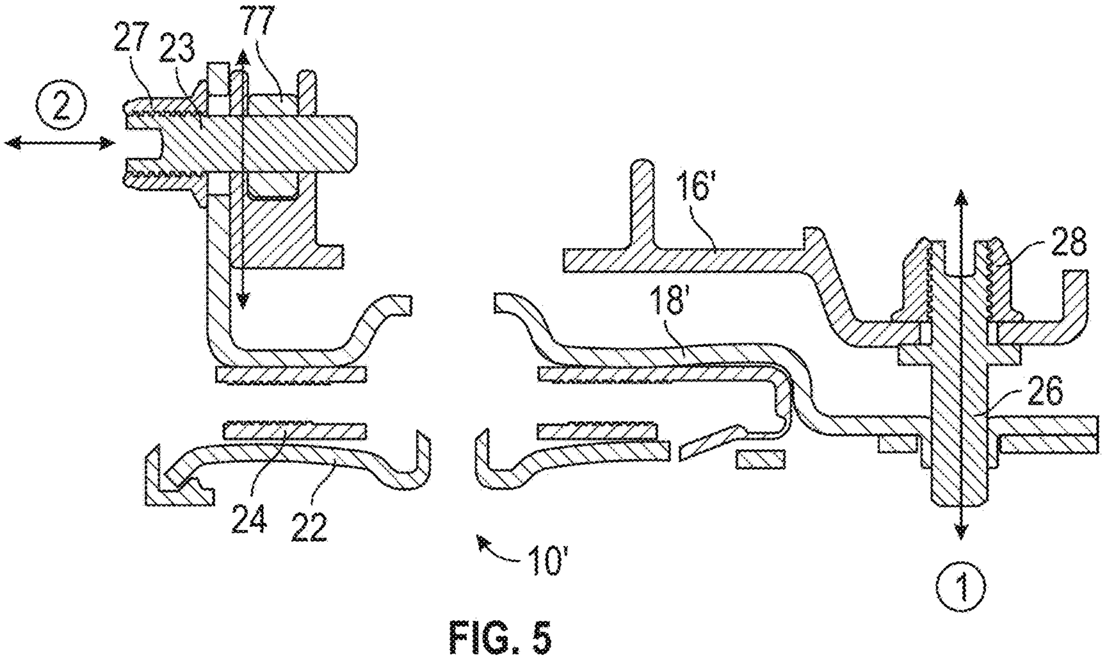
FIG. 5 is a view along lines 5-5 of FIG. 4.

Referring now to FIGS. 4 and 5 an alternative embodiment of the present disclosure is illustrated. Here the pivoting cursor, the main body portion and the picoting plate are designated by the following reference numerals 10', 16' and 18'. In this embodiment, the first adjusting screw or first threaded adjuster 26 is similar to the first adjusting screw or first threaded adjuster 26 illustrated in FIGS. 2 and 3. Here the connecting member 21 is removed and the second adjusting screw 23 or second threaded adjuster 23 directly secures the main body portion 16 to the pivoting plate or swing plate 18. In addition, the second adjusting screw 23 or second threaded adjuster 23 is offset from the first adjusting screw 26 or second threaded adjuster 26. In addition, the second adjusting screw 23 or second threaded adjuster 23 of this embodiment has a different configuration and it also engages a nut 77.

Figure 6:
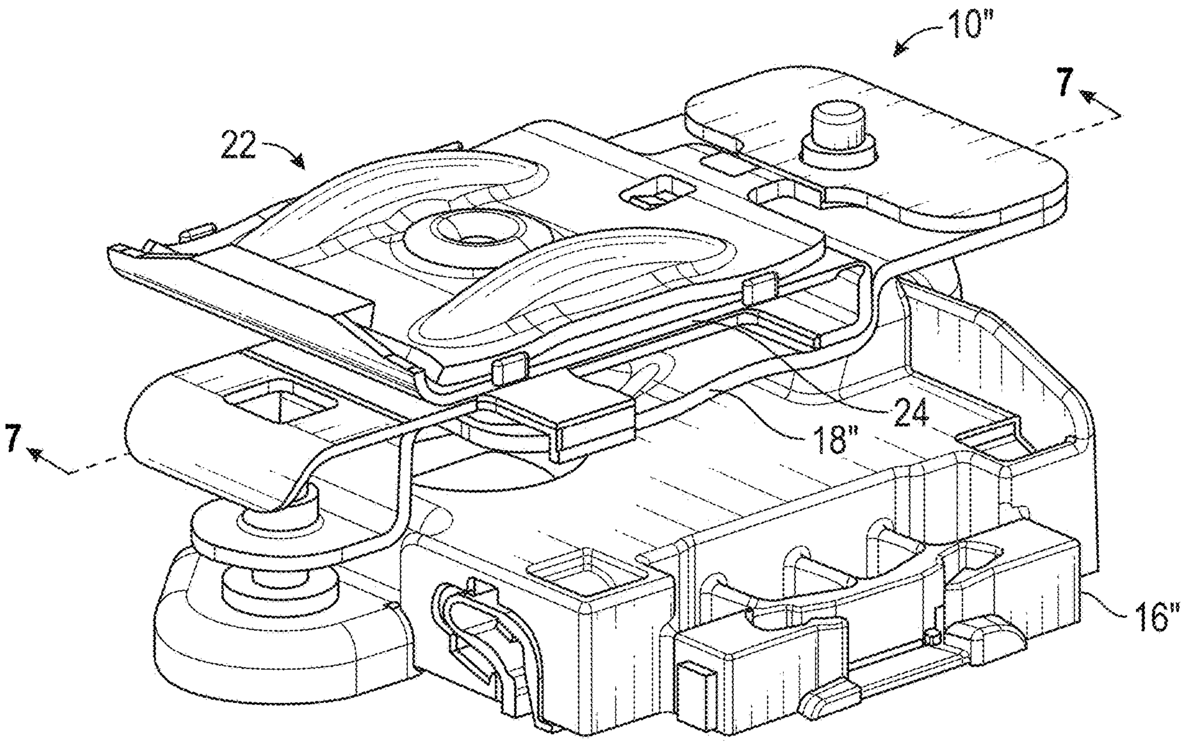
FIG. 6 is a perspective view of a pivoting cursor in accordance with another embodiment of the present disclosure.
Figure 7:
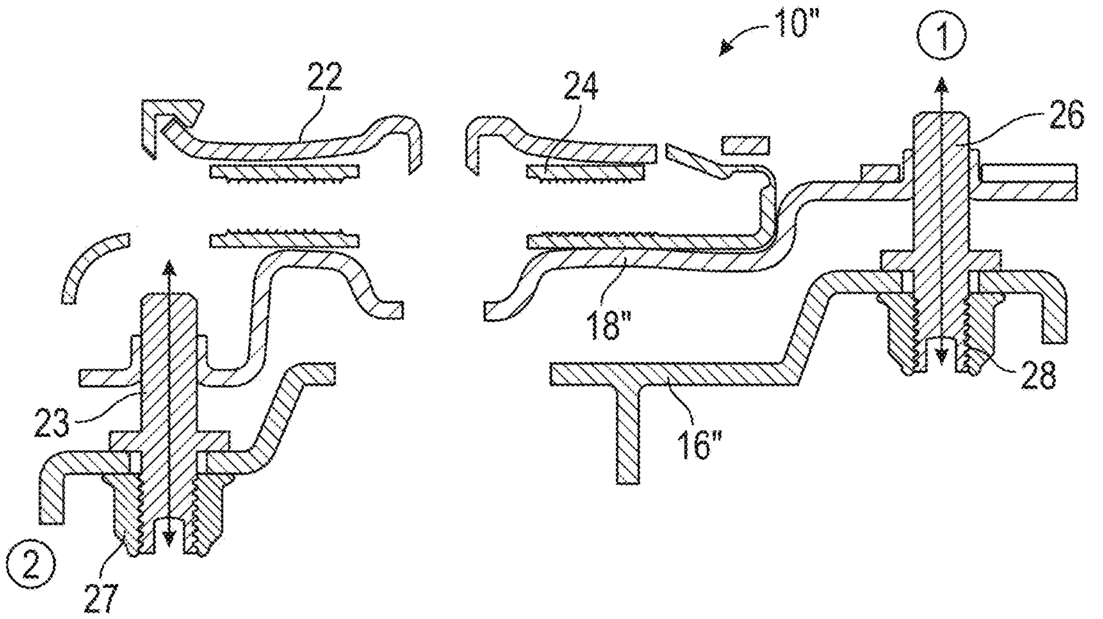
FIG. 7 is a view along lines 7-7 of FIG. 6.

Referring now to FIGS. 6 and 7 another alternative embodiment of the present disclosure is illustrated. Here the pivoting cursor, the main body portion and the picoting plate are designated by the following reference numerals 10", 16" and 18". In this embodiment, the first adjusting screw or first threaded adjuster 26 is similar to the first adjusting screw or first threaded adjuster 26 illustrated in FIGS. 2 and 3. In this embodiment, the second adjusting screw 23 or second threaded adjuster 23 is similar to the second adjusting screw 23 or second threaded adjuster 23 illustrated in FIGS. 2 and 3 and directly secures the main body portion 16 to the pivoting plate or swing plate 18. Here, the second adjusting screw 23 or second threaded adjuster 23 is parallel to the first adjusting screw 26 or second threaded adjuster 26.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A pivoting cursor for a frameless window of a vehicle door, comprising:
- a main body portion;
- a pivoting plate pivotally secured to the main body portion for pivotal movement about an axis;
- a glass clamping plate;
- a seal;
- a first adjusting screw for pivoting the pivoting plate with respect to the main body portion; and
- a second adjusting screw adjusting a location of the main body portion with respect to the pivoting plate; wherein a longitudinal axis of the second adjusting screw is parallel to a longitudinal axis of the first adjusting screw.

2. The pivoting cursor as in claim 1, further comprising a connecting member that is secured to the main body portion via the second adjusting screw.

3. The pivoting cursor as in claim 1, wherein the second adjusting screw directly connects the main body portion to the pivoting plate.

4. The pivoting cursor as in claim 3, wherein the second adjusting screw is offset from the first adjusting screw.

5. The pivoting cursor as in claim 1, wherein rotation of the first adjusting screw about the longitudinal axis of the first adjusting screw causes the pivoting plate to move closer to or further from the main body portion.

6. The pivoting cursor as in claim 5, wherein rotation of the second adjusting screw about the longitudinal axis of the second adjusting screw causes the pivoting plate to move closer to or further from the main body portion.

7. The pivoting cursor as in claim 1, wherein rotation of the second adjusting screw about the longitudinal axis of the second adjusting screw causes the pivoting plate to move closer to or further from the main body portion.

8. A door module, comprising:
- a window regulator secured to the door module, the window regulator including a pair of guide rails fixedly secured to the door module; and
- a pivoting cursor for slidably engaging one of the pair of guide rails, the pivoting cursor comprising:
- a main body portion;
- a pivoting plate pivotally secured to the main body portion for pivotal movement about an axis;
- a glass clamping plate;
- a seal;
- a first adjusting screw for pivoting the pivoting plate with respect to the main body portion; and
- a second adjusting screw adjusting a location of the main body portion with respect to the pivoting plate; wherein a longitudinal axis of the second adjusting screw is parallel to a longitudinal axis of the first adjusting screw.

9. The door module as in claim 8, further comprising a connecting member that is secured to the main body portion via the second adjusting screw.

10. The door module as in claim 8, wherein the second adjusting screw directly connects the main body portion to the pivoting plate.

11. The door module as in claim 10, wherein the second adjusting screw is offset from the first adjusting screw.

12. The door module as in claim 8, further comprising a nut for locking a position of the first adjusting screw with respect to the main body portion.

13. The door module as in claim 8, wherein rotation of the second adjusting screw about the longitudinal axis of the second adjusting screw causes the pivoting plate to move closer to or further from the main body portion.

14. The door module as in claim 8, wherein rotation of the first adjusting screw about the longitudinal axis of the first adjusting screw causes the pivoting plate to move closer to or further from the main body portion.

15. The door module as in claim 14, wherein rotation of the second adjusting screw about the longitudinal axis of the second adjusting screw causes the pivoting plate to move closer to or further from the main body portion.

* * * * *